United States Patent [19]
Sidwell et al.

[11] Patent Number: 5,875,355
[45] Date of Patent: Feb. 23, 1999

[54] METHOD FOR TRANSPOSING MULTI-BIT MATRIX WHEREIN FIRST AND LAST SUB-STRING REMAINS UNCHANGED WHILE INTERMEDIATE SUB-STRINGS ARE INTERCHANGED

[75] Inventors: Nathan Mackenzie Sidwell, St. Werburghs; Catherine Louise Barnaby, Coalpit Health, both of United Kingdom

[73] Assignee: SGS-Thomson Microelectronics Limited, Almondsbury, United Kingdom

[21] Appl. No.: 649,785

[22] Filed: May 17, 1996

[30] Foreign Application Priority Data

May 17, 1995 [GB] United Kingdom .................... 9509988

[51] Int. Cl.⁶ ....................................................... G06F 7/00
[52] U.S. Cl. .......................... 395/898; 395/885; 708/502
[58] Field of Search .................................... 395/898, 885; 364/189.12, 736.03

[56] References Cited

U.S. PATENT DOCUMENTS

| | | | |
|---|---|---|---|
| 3,810,112 | 5/1974 | Aho et al. ............................. | 340/172.5 |
| 4,109,310 | 8/1978 | England et al. ........................ | 395/590 |
| 4,425,617 | 1/1984 | Sherwood ............................... | 395/885 |
| 4,602,283 | 7/1986 | Corgnier et al. ......................... | 380/14 |
| 5,247,613 | 9/1993 | Bromley ............................... | 395/200.18 |
| 5,301,342 | 4/1994 | Scott ..................................... | 711/111 |
| 5,473,566 | 12/1995 | Rao .................................... | 365/189.12 |
| 5,640,545 | 6/1997 | Baden et al. ............................. | 395/55 |
| 5,686,960 | 11/1997 | Sussman et al. ......................... | 348/218 |

FOREIGN PATENT DOCUMENTS

WO-A-94 27211  11/1994  WIPO.

OTHER PUBLICATIONS

Duhamel (A connection between bit reversal and matrix transposition: Hardware and software consequences) IEEE pp. 1893–1896, Jul. 1989.

Panchanathan (Universal architecture for matrix transposition) IEEE pp. 387–392, Sep. 1992.

Standard Search Report issued by the European Patent Office dated Sep. 18, 1995.

IEEE Transactions on Computers, Jul. 1972 New York, US, pp. 801–803, Eklundh "A Fast Computer Method For Matrix Transposing".

IBM Technical Disclosure Bulletin, vol. 31, No. 6, Nov. 1988 New York, US, pp. 62–63, "Packed and Plane Color Support System".

Primary Examiner—Parshotam S. Lall
Assistant Examiner—Gautam R. Patel
Attorney, Agent, or Firm—Wolf, Greenfield & Sacks, P.C.

[57] ABSTRACT

A method of effecting a matrix transpose operation in a computer is described. The method uses a computer instruction which restructures a data string by retaining first and last sub-strings of the data string in unchanged positions and interchanges the position of at least two intermediate sub-strings. The data string is formed from sub-strings each representing one or more data value in a matrix.

The computer instruction can be effected in a single register store having a predetermined bit capacity addressable by a single address, or in a pair of such register stores.

The data restructuring instructions include "flip", "zip" and "unzip" instructions.

6 Claims, 11 Drawing Sheets

4 BY 4 MATRIX TRANSPOSE USING ZIPS

PROCESSOR & MEMORY

PACKED UNIT

OBVIOUS PACKED ARITHMETIC

| SYMBOL | OPERATION |
|---|---|
| ∇ | ARITHMETIC LOGIC UNIT. COMBINES THE TWO SOURCE VALUES IN SOME MANNER TO PRODUCE A RESULT. |
| R[3] R[2] R[1] R[0] | BUFFER. THIS PARTICULAR ONE HAS AN INPUT WHICH IS UNSEPARATED AND FOUR SEPARATED OUTPUTS, EACH TAKING ONE QUARTER OF THE INPUT SIGNALS, IT ALSO HAS AN OUTPUT ENABLE INPUT. |
|  | MULTIPLEXER. THE OUTPUT CONSISTS OF ONE OF THE TWO INPUT SIGNALS. WHEN THE CONTROL SIGNAL IS NOT ASSERTED, THE UNSHADED INPUT SIGNAL IS OUTPUT. WHEN THE CONTROL SIGNAL IS ASSERTED, THE SHADED INPUT SIGNAL IS OUTPUT. |
|  | CHANGEOVER SWITCH. EACH OF THE TWO OUTPUTS CONSISTS OF ONE OF THE INPUT SIGNALS. WHEN THE CONTROL SIGNAL IS NOT ASSERTED, THE UNSHADED INPUT GOES TO THE UNSHADED OUTPUT AND THE SHADED INPUT GOES TO THE SHADED OUTPUT. WHEN THE CONTROL SIGNAL IS ASSERTED, THE OUTPUTS SWAP OVER. |

FIG. 3
SYMBOLS

OBVIOUS PACKED ARITHMETIC WITH UNPACKED OPERAND

BYTE REPLICATE

ZIP AND UNZIP

FLIP

64-BIT ZIPS AND UNZIPS

DOUBLE LENGTH 8-BIT ZIP AND UNZIP

DOUBLE LENGTH 16-BIT AND 32-BIT ZIP AND UNZIP

8-BIT FLIPS

16-BIT AND 32-BIT FLIPS

4 BY 4 MATRIX TRANSPOSE USING FLIPS

4 BY 4 MATRIX TRANSPOSE USING ZIPS

4 BY 4 MATRIX TRANSPOSE USING UNZIPS

REPLICATION BY ZIPS

METHOD FOR TRANSPOSING MULTI-BIT MATRIX WHEREIN FIRST AND LAST SUB-STRING REMAINS UNCHANGED WHILE INTERMEDIATE SUB-STRINGS ARE INTERCHANGED

FIELD OF THE INVENTION

This invention relates to matrix transposition.

BACKGROUND TO THE INVENTION

It is known to store in memory a matrix in which a plurality of data values constituting each row of the matrix are located at adjacent memory locations in the memory. Each row of the matrix comprises a plurality of data values. The sequence of data values in the row is therefore predetermined by the order in which they are stored in memory. In a matrix transpose operation, it is required to interchange row and column values so that sequential data values in a row are located in the transposed matrix as sequential column values in a column. At present, such a matrix transpose operation can only be carried out by retrieving individual data values from memory, temporarily storing them in separate registers and writing them back to memory in a different location. Operations of this nature require repeated accesses to memory and a long sequence of instructions. The instruction sequence takes up space in memory. It is desirable to reduce where possible the length of instruction sequences. It is also desirable to minimise memory accesses, because these are slow operations.

SUMMARY OF THE INVENTION

According to one aspect of the present invention there is provided a method of operating a computer system to effect a matrix transpose operation of a matrix comprising a plurality of data values at respective row and column locations, which method comprises:

forming a data string from a plurality of sub-strings each representing one or more said data value;

holding said data string in a computer store having a predetermined bit capacity wherein said sub-strings are not individually addressable; and restructuring said data string by retaining first and last sub-strings of the data string in unchanged positions and interchanging the position of at least two intermediate sub-strings, in a restructured data string, to effect an interchange of selected data values.

The computer store can be provided by a single register store having a predetermined bit capacity addressable by a single address or by a pair of register stores. Where a single register store is provided, a data string is constituted from two rows of the matrix and held in a single register store. Where a pair of register stores is provided, each register store holds one row of the matrix, the contents of the pair of register stores constituting the data string.

It will readily be appreciated that in the course of transposing a matrix, the two rows of the matrix held in the register or pair of registers and constituting the data string will not always be adjacent rows.

With the present invention it becomes a simple matter to effect a matrix transpose operation by performing a sequence of restructuring operations on data strings held in the computer store.

One type of data restructuring instruction used herein is termed a "flip" instruction, in which the at least two intermediate sub-strings are exchanged with each other.

Another type of data restructuring instruction is termed a "zip" instruction, wherein adjacent ones of the intermediate sub-strings are located at alternate locations in the restructured data string.

Another type of data restructuring instruction is termed herein a "unzip" instruction, in which alternate ones of the intermediate sub-strings are located adjacent one another in the restructured data string.

For a better understanding of the present invention and to show how the same may be carried into effect reference will now be made by way of example to the accompanying drawings.

BRIEF DESCRIPTION OF THE DRAWINGS

FIG. 3 shows the meaning of symbols used in the figures;

DESCRIPTION OF THE PREFERRED EMBODIMENT

Figure 1:
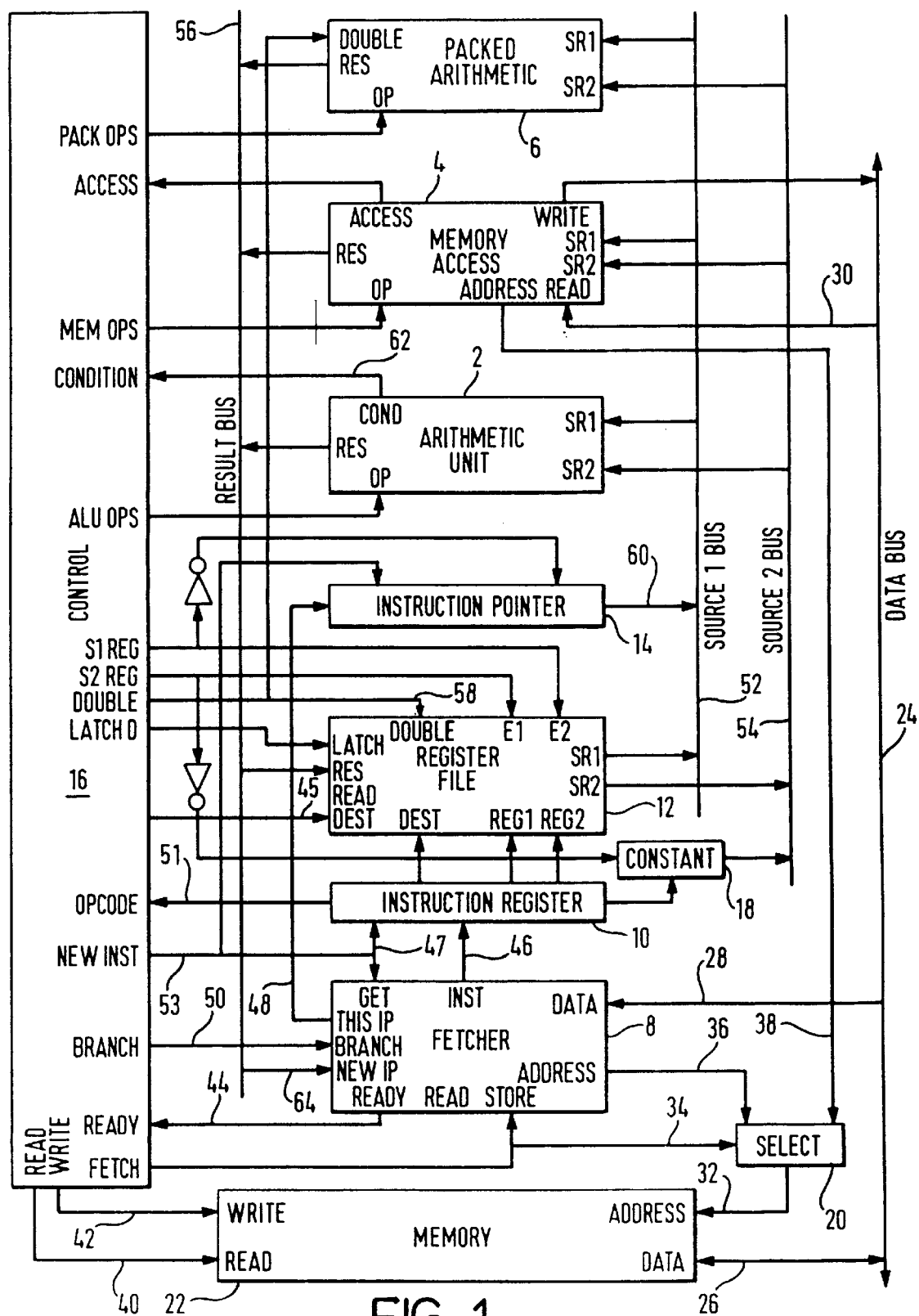
FIG. 1 is a block diagram of a processor and memory of a computer.

FIG. 1 shows a processor in accordance with one embodiment of the present invention. The processor has three execution units including a conventional arithmetic unit 2 and a memory access unit 4. In addition there is a packed arithmetic unit 6. The processor also includes an instruction fetcher 8, an instruction register 10, a register file 12 and an instruction pointer 14 all of which operate under the control of a control unit 16 of the processor. The register file comprises a set of registers each having a predetermined bit capacity and each being addressable with a single address. It is not possible to address individual locations within a register. When a register is accessed, the entire contents of the register are concerned. The processor further includes a constant unit 18 and a select unit 20. The constant unit 18 and select unit 20 are also operated under the control of the control unit 16. The processor operates in conjunction with a memory 22 which holds instructions and data values for effecting operations of the processor. Data values and instructions are supplied to and from the memory 22 via a data bus 24. The data bus 24 supplies data values to and from the memory 22 via a memory data input 26. The data bus 24 also supplies data to the instruction fetcher 8 via a fetcher data input 28 and to the memory access unit 4 via a memory access read input 30. The memory is addressed via the select unit 20 on address input 32. The select unit 20 is controlled via a fetch signal 34 from the control unit 16 to select an address 36 from the fetcher 8 or an address 38 from the memory access unit 4. Read and write control lines 40,42 from the control unit 16 control read and write operations to and from the memory 22. The instruction fetcher 8 fetches instructions from the memory 22 under the control of the control unit 16 as follows. An address 36 from which instructions are to be read is provided to the memory 22 via the select unit 20. These instructions are provided via the data bus 24 to the fetcher data input 28. When the instruction fetcher has fetched its next instruction, or in any event has a next instruction ready, it issues a Ready signal on line 44 to the control unit 16. The instruction which is to be executed is supplied to the instruction register 10 along instruction line Inst 46 and held there during its execution. The instruction pointer 14 holds the address of the instruction being executed supplied to it from the fetcher 8 via instruction pointer line 48. A Get signal 47 responsive to a New Inst signal 53 from the control unit 16 causes the instruction register 10 to store the next instruction on Inst line 46 and causes the fetcher 8 to prepare the next instruction. The New Inst signal 53 also causes the instruction pointer 14 to store the address of the next instruction. A branch line 50 from the control unit 16 allows the instruction fetcher 8 to execute branches.

The instruction register 10 provides Source 1 and Source 2 register addresses to the register file 12 as Reg1 and Reg2. A result register address is provided as Dest. Opcode is provided to the control unit 16 along line 51. In addition, some instructions will provide a constant operand instead of encoding one or both source registers. The constant is provided by the constant unit 18. The instruction's source values are provided on Source 1 and Source 2 busses 52,54 by the appropriate settings of the S1 Reg and S2 Reg signals at inputs E1,E2. The correct execution unit is enabled by providing the appropriate values for Pack Ops, Mem Ops and ALU Ops signals from the control unit 16 in accordance with the Opcode on line 51. The enabled unit will normally provide a result Res on a result bus 56. This is normally stored in the selected result register Dest in the register file 12. There are some exceptions to this.

Some instructions provide a double length result. These store the first part of the result in the normal way. In a subsequent additional stage, the second part of the result is stored in the next register in the register file 12 by asserting a Double signal 58.

Branches 50 need to read and adjust the instruction pointer 14. These cause the S1 Reg signal not to be asserted, and so the instruction pointer 14 provides the Source 1 value on line 60. The Source 2 value is provided in the normal way (either from a register in the register file 12, or the constant unit 18). The arithmetic unit 2 executes the branch calculations and its result is stored into the fetcher 8 on the New IP input 64, rather than the register file 12, signalled by the Branch line 50 from the control unit 16. This starts the fetcher from a new address.

Conditional branches must execute in two stages depending on the state of condition line 62. The first stage uses the Dest register as another source, by asserting a Read Dest signal 45. If the condition is satisfied, then the normal branch source operands are read and a branch is executed.

Calls must save a return address. This is done by storing the instruction pointer value in a destination register prior to calculating the branch target.

The computer described herein has several important qualities.

Source operands are always the natural word length. There can be one, two or three source operands.

The result is always the natural word length, or twice the natural word length. There is a performance penalty when it is twice the natural word length as it takes an extra stage to store and occupies two, rather than one, registers. For this computer, assume a natural word length of 64 bits. That is, each register in the register file has a predetermined capacity of 64 bits.

The execution units 2,4,6 do not hold any state between instruction execution. Thus subsequent instructions are independent.

Non-Packed Instructions

The arithmetic unit 2 and memory access unit 4, along with the control unit 16 can execute the following instructions of a conventional instruction set. In the following definitions, a register is used to denote the contents of a register as well as a register itself as a storage location, in a manner familiar to a person skilled in the art.

mov Move a constant or a register into a register
  add Add two registers together and store the result in a third register (which could be the same as either of the sources)
  sub Subtract two registers and store the result in a third register
  load Use one register as an address and read from that location in memory, storing the result into another register
  store Use one register as an address and store the contents of another register into memory at the location specified by the address
  cmpe Compare two registers (or a register and a constant) for equality. If they are equal, store 1 into the destination register otherwise store zero
  cmpge Compare two registers (or a register and a constant) for orderability. If the second is not less than the first, store 1 into the destination register otherwise store zero
  jump Unconditional jump to a new location
  jumpz Jump to a new program location, if the contents of a specified register is zero
  jumpnz Jump to a new program location, if the contents of a specified register is not zero
  shr Perform a bitwise right shift of a register by a constant or another register and store the result in a destination register. The shift is signed because the sign bit is duplicated when shifting.
  shl Perform a bitwise left shift of a register by a constant or another register and store the result in a destination register
  or/xor Perform a bit-wise logical operation (or/xor) on two registers and store result in destination register.

Packed Unit

Figure 2:
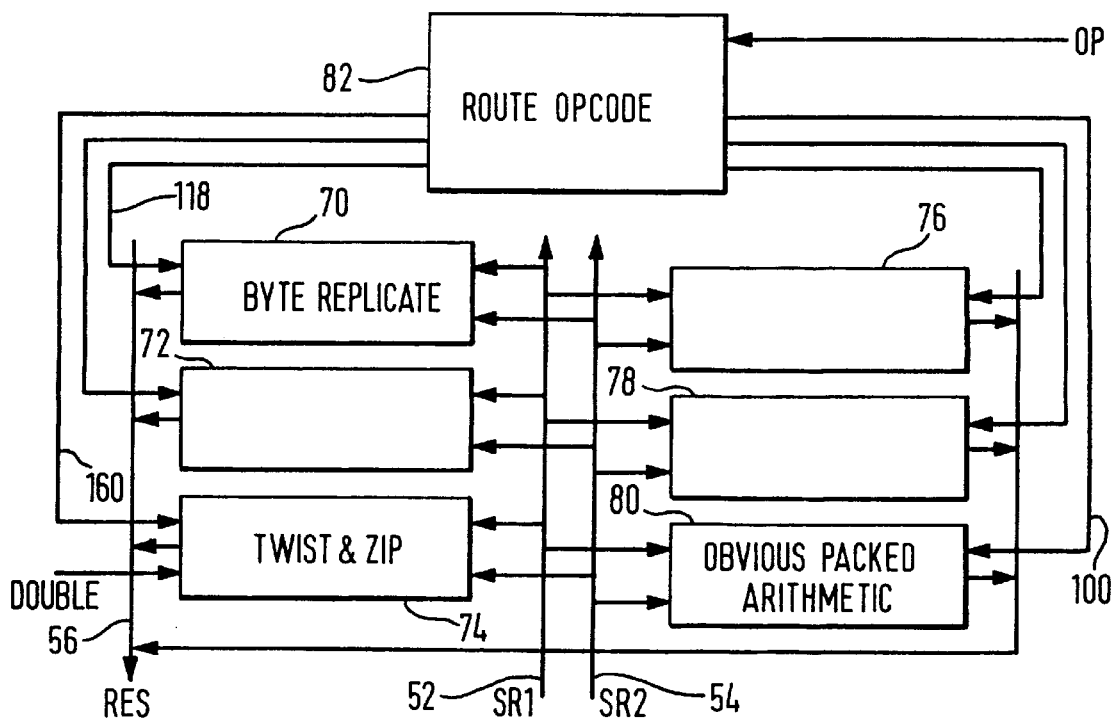
FIG. 2 is a block diagram of a packed arithmetic unit.

FIG. 2 shows in a block diagram the packed arithmetic unit 6. This is shown as a collection of separate units each responsible for some subset of packed arithmetic instructions. It is quite probable that another implementation could combine the functions in different ways. The units include a byte replicate unit 70, a twist and zip unit 74, an obvious packed arithmetic unit 80 and other packed arithmetic units 72,76,78 not described herein. These are operated responsive to a route opcode unit 82 which selectively controls the arithmetic units 70 to 80. Operands for the arithmetic units 70 to 80 are supplied along the Source 1 and Source 2 busses 52,54. Results from the arithmetic units are supplied to the result bus 56. The op input to the route opcode unit 82 receives the Pack Ops instruction from the control unit 16 (FIG. 1). It will be appreciated that the operands supplied on the Source 1 and Source 2 busses are loaded into respective input buffers of the arithmetic units and the results supplied from one or two output buffers t one or two destination registers in the register file 12.

Obvious Packed Arithmetic

The obvious packed arithmetic unit 80 performs operations taking the two source operands as containing several packed objects each and operating on respective pairs of objects in the two operands to produce a result also containing the same number of packed objects as each source. The operations supported can be addition, subtraction, comparison, multiplication, left shift, right shift etc. As explained above, by addressing a register using a single address an operand will be accessed. The operand comprises a plurality of objects which cannot be individually addressed.

FIG. 3 shows the symbols used in the diagrams illustrating the arithmetic units of the packed arithmetic unit 6.

Figure 4:
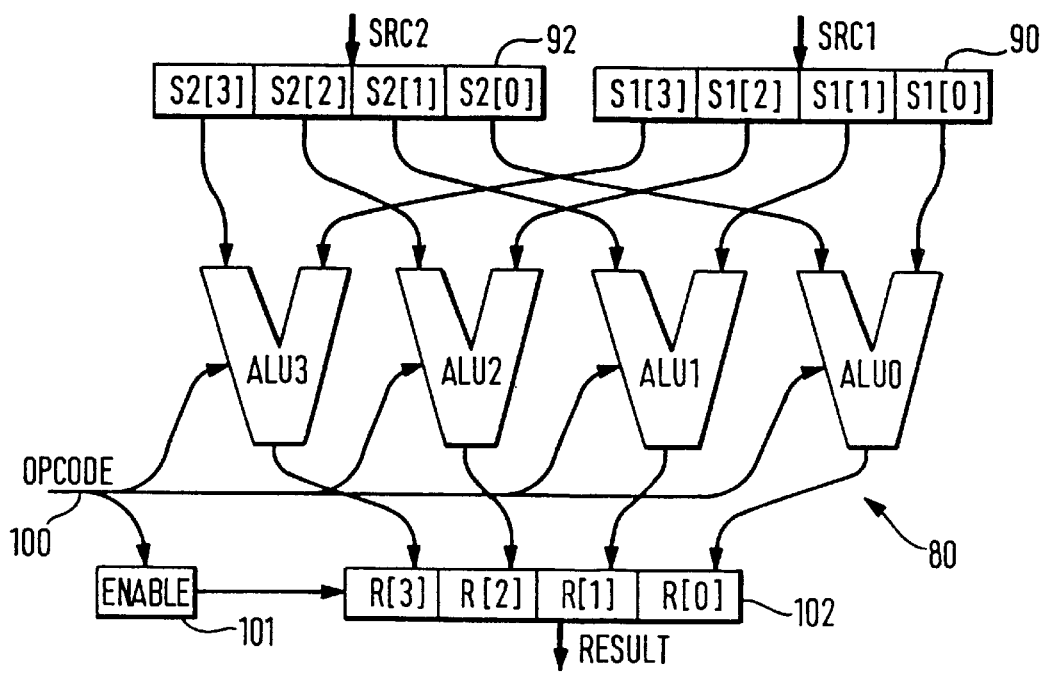
FIG. 4 is a block diagram of an obvious packed arithmetic unit operating on two packed source operands.

FIG. 4 shows an obvious packed arithmetic unit which can perform addition, subtraction, comparison and multiplication of packed 16 bit numbers. As, in this case, the source and result bus widths are 64 bit, there are four packed objects, each 16 bits long, on each bus.

The obvious packed arithmetic unit 80 comprises four arithmetic logical units ALU0–ALU3, each of which are controlled by opcode on line 100 which is derived from the route opcode unit 82 in FIG. 3. The 64 bit word supplied from source register 1 SRC1 contains four packed objects S1[0]–S1[3]. The 64 bit word supplied from source register 2 SRC2 contains four packed objects S2[0]–S2[3]. These are stored in first and second input buffers 90,92. The first arithmetic logic unit ALU0 operates on the first packed object in each operand, S1[0] and S2[0] to generate a result R[0]. The second to fourth arithmetic logic units ALU1–ALU3 similarly take the second to fourth pairs of objects and provide respective results R[1] to R[3]. These are stored in a result buffer 102. The result word thus contains four packed objects. An enable unit 101 determines if any of the unit should be active and controls whether the output buffer asserts its output.

The instructions are named as follows:

add2p Add each respective S1[i] to S2[i] as 2's complement numbers producing R[i]. Overflow is ignored.

sub2p Subtract each respective S2[i] from S1[i] as 2's complement numbers producing R[i]. Overflow is ignored.

cmpe2p Compare each respective S1[i] with S2[i]. If they are equal, set R[i] to all ones; if they are different, set R[i] to zero.

cmpge2ps Compare each respective S1[i] with S2[i] as signed 2's complement numbers. If S1[i] is greater than or equal to S2[i] set R[i] to all ones; if S1[i] is less than S2[i] set R[i] to zero.

mul2ps Multiply each respective S1[i] by S2[i] as signed 2's complement numbers setting R[i] to the least significant 16 bits of the full (32 bit) product.

Figure 5:
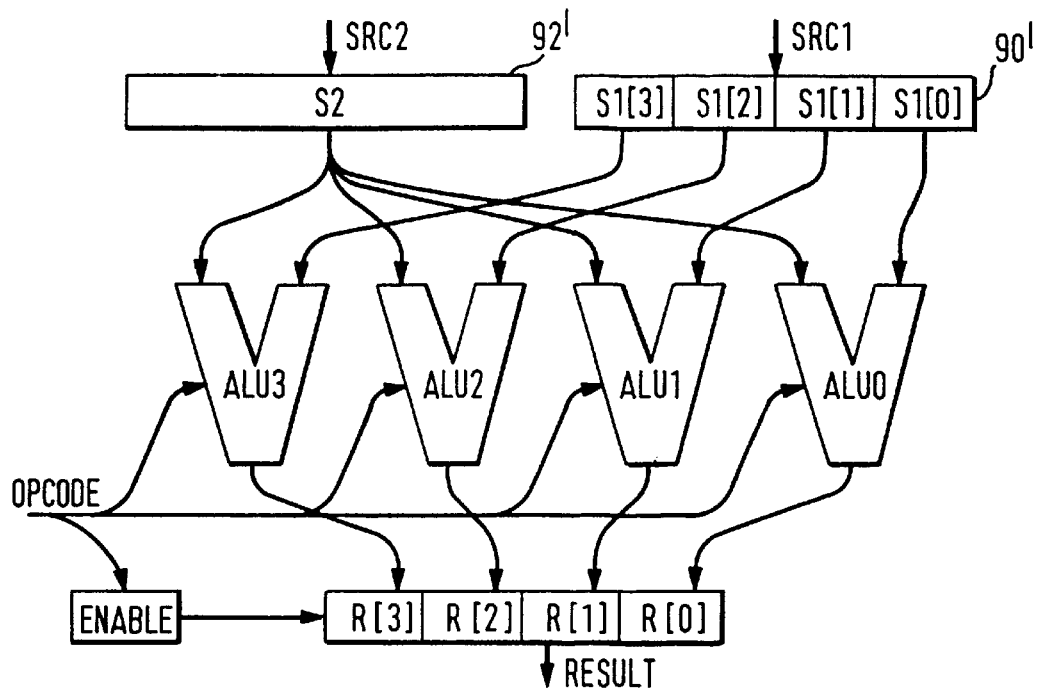
FIG. 5 is a block diagram of an obvious packed arithmetic unit which operates on a packed source operand and an unpacked source operand.

Some obvious packed arithmetic instructions naturally take one packed source operand and one unpacked source operand. FIG. 5 shows such a unit.

The contents of the packed arithmetic unit of FIG. 5 are substantially the same as that of FIG. 4. The only different is that the input buffer 92' for the second source operand receives the source operand in unpacked form. The input buffer 92' receives the first source operand in packed form as before. One example of instructions using an unpacked source operand and a packed source operand are shift instructions, where the amount to shift by is not packed, so that the same shift can be applied to all the packed objects. Whilst it is not necessary for the shift amount to be unpacked, this is more useful.

shl2p Shift each respective S1[i] left by S2 (which is not packed), setting R[i] to the result.

shr2ps Shift each respective S1[i] right by S2 (which is not packed), setting R[i] to the result. The shift is signed, because the sign bit is duplicated when shifting.

It is assumed that the same set of operations are provided for packed 8 bit and packed 32 bit objects. The instructions have similar names, but replacing the "2" with a "1" or a "4".

Byte Replicate

Figure 6:
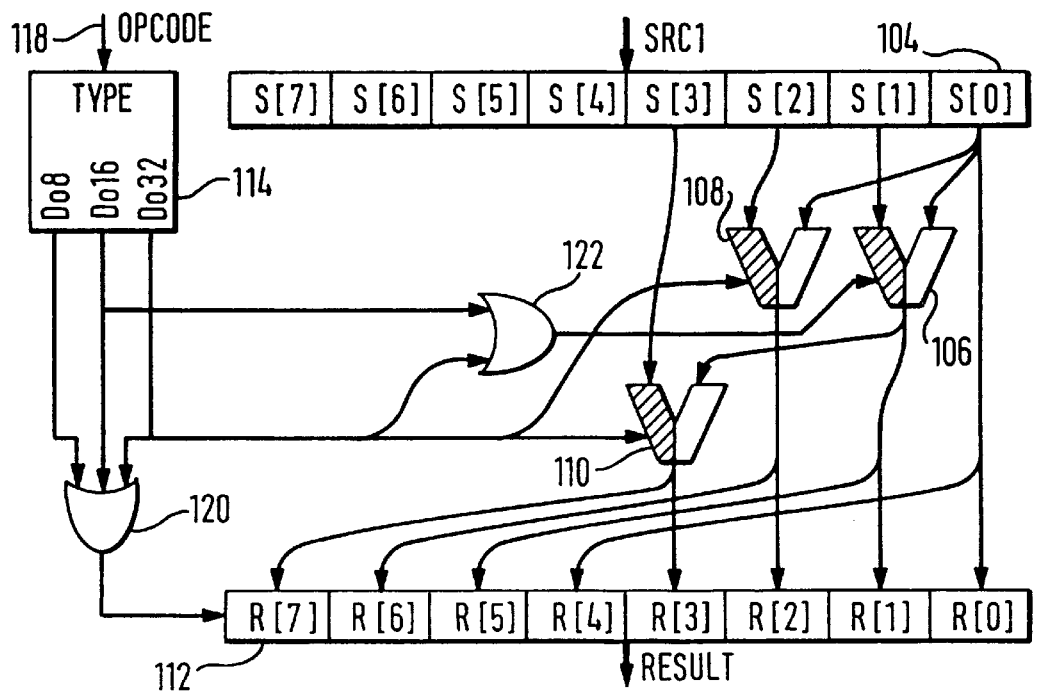
FIG. 6 shows a byte replicate unit.

FIG. 6 shows the byte replicate unit 70. The byte replicate unit comprises an input buffer 104 which receives a single operand which in FIG. 6 is illustrated as a 64 bit word comprising eight packed 8 bit objects S[0] to S[7]. A first multiplexor 106 receives as inputs the first object S[0] and the second object S[1]. A second multiplexor 108 receives as inputs the first object S[0] and the third object S[2]. A third multiplexor 110 receives as inputs the output of the first multiplexor 108 and the fourth object S[3]. The byte replicate unit also comprises an output buffer 112. The output buffer holds a 64 bit word packed as eight 8 bit objects R[0] to R[7]. The first and fifth 8 bit locations of the output buffer 112 are connected directly to the first 8 bits of the input buffer 104. The second and sixth 8 bit locations of the output buffer 112 are connected to receive the output of the first multiplexor 106. The third and seventh 8 bit locations of the output buffer 112 are connected to receive the output of the second multiplexor 108. The fourth and eighth 8 bit locations of the output buffer 112 are connected to receive the output of the third multiplexor 110. The 8 bit result objects in the output buffer are referred to as R[0] to R[7]. A type unit 114 receives opcode on line 118 derived from the route opcode unit 82 in FIG. 3. The type unit selects the size of the object to be replicated and provides one of three output signals D08,D016,D032. These output signals are supplied to an OR gate 120. The output of the OR gate enables the output buffer 112. The D016 and D032 signals are input to a second OR gate 122 the output of which controls the first multiplexor 106. The D032 signal itself controls the second and third multiplexors 108,110. The byte replicate unit thus takes the least significant object (8, 16 or 32 bits) of the source operand and replicates it 8, 4 or 2 times, to produce the packed 64 bit result held in output buffer 112. The operation is broken down into 8 bit pieces, each of S[i] and R[i] are 8 bits. Some logic is shared for the different replications. The type unit 114 determines whether to replicate 16 bit or 32 bit sequences. If neither signal Do16 or Do32 is asserted, 8 bit sequences will be replicated.

The three instructions supported by the byte replicate unit are:

rep1p Replicate S[0] into each of R[0] to R[7].
rep2p Replicate S[0] and S[1] into R[2i] and R[2i+1] for i from 0 to 3, thus replicating 16 bits.
rep4p Replicate S[0] to S[3] into R[4i] to R[4i+3] for i from 0 to 1, thus replicating 32 bits.

Twist and Zip

There are three kinds of restructuring operations executed by the twist and zip unit 74. These are:

Shuffle (zip) This takes a source string consisting of pairs of object strings and interleaves the objects from the object string pairs to produce a single resultant string of the same length as the source string. This is a perfect shuffle.

Sort (unzip) This takes a source string containing object pairs and deinterleaves the pairs to produce a result string consisting of the concatenation of the deinterleaved pairs. This is a perfect sort.

Transpose (flip) This takes a source string containing object quadruples and produces a result string by exchanging appropriate source objects to affect a set of matrix transposes.

Any one of these operations can alternatively be constructed from suitable combinations of the other two operations.

For all these transformations the source string consists of a number of vectors, each containing the same number of equally sized objects. To name these transformations requires three numbers.

number of vectors This specifies the number of vectors in the source and result strings.
size of vector This specifies the number of objects in each vector.
size of object This specifies the number of bits in each object.

The instruction names consist of a transform type (zip, unzip, flip), followed by the number of vectors suffixed by an "n", the size of each vector suffixed by a "v" and the object size expressed as a number of 8 bit bytes suffixed by a "p". Thus, in the instruction zip4n2v1p, zip denotes the instruction type, and 4n2v1p specifies the operand format. In this case a zip operation is to be executed on 4 vectors each of two one byte objects. To do this particular operation, as each zip requires two vectors, two separate zips are done.

Figure 7:
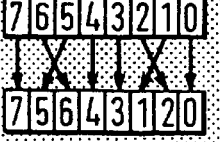
FIG. 7 shows zip and unzip restructuring operations.

When the source and result strings are 64 or 128 bits in total there are 9 unique zip and unzip transforms which are shown in FIG. 7.

This set of zips and unzips is complete for the 64 and 128 bit strings supported by this implementation. Zips and unzips of longer strings can be performed by sequences of these instructions, in conjunction with conventional move instructions.

Figure 8:
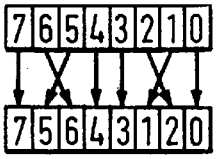
FIG. 8 shows flip restructuring operations.

The flips appropriate to 64 and 128 bit strings are shown in FIG. 8. Some of these are the same as some of the zip and unzips in FIG. 7.

As with the zips and unzips, this set of flips is complete for 64 and 128 bit strings. Flips of longer strings can be performed by sequences of flips and conventional move instructions.

Figure 9:
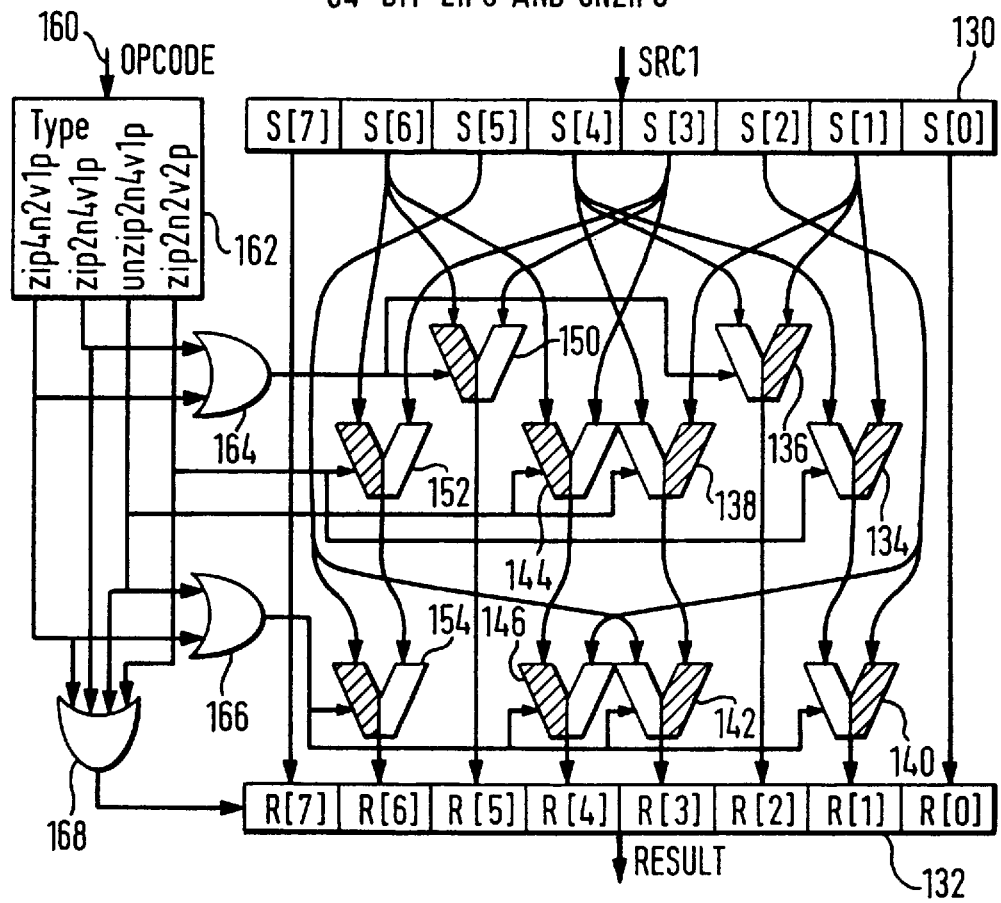
FIG. 9 shows part of the twist and zip unit for performing 64 bit zips and unzips.

FIG. 9 shows the part of the twist and zip unit 74 which deals with 64 bit zips and unzips. The zip and unzip part of the twist and zip unit shown in FIG. 9 comprises an input buffer 130 containing eight packed 8 bit source objects S[0] to S[7]. A result buffer 132 is provided to hold eight packed 8 bit result objects R[0] to R[7]. The result R[0] is connected directly to the first source object S[0]. The second source object S[1] is supplied as one input to a first multiplexor 134, a second multiplexor 136, and a third multiplexor 138. The first, second and third multiplexors 134,136,138 receive as their second input the fifth source object S[4]. A fourth multiplexor 140 receives as one input the third source object S[2] and as its other input the output of the first multiplexor 134. The output of the fourth multiplexor provides the second result object R[1]. The output of the second multiplexor 136 provides the third result object R[2]. A fifth multiplexor 142 receives as inputs the output of the third multiplexor 138 and the sixth source object S[5]. The output of the fifth multiplexor 142 supplies the fourth result object R[3]. A sixth multiplexor 144 receives as one input the fourth source object S[3] and as the other input the seventh source object S[6]. The output of the sixth multiplexor is supplied as one input to a seventh multiplexor 146, the other input of which is the third source object S[2]. The output of the seventh multiplexor 146 supplies the fourth result object R[4]. An eighth multiplexor 150 receives as one input the fourth source object S[3] and as another input the seventh source object S[6] and supplies as its output the sixth result object R[5]. A ninth multiplexor 152 receives as one input the fourth source object S[3] and as another input the seventh source object S[6]. The output of the ninth multiplexor 152 is supplied to a tenth multiplexor 154 which receives as a second input the sixth source object S[5]. The output of the tenth multiplexor 154 provides the seventh result object R[6]. The eighth source object S7 is connected directly to provide the eighth result object R7. A type unit 162 receives opcode on line 160 derived from the route opcode unit 82 in FIG. 2. The type unit 162 defines the instruction to be executed by the zip and unzip part of the twist and zip unit 74. For this purpose it supplies one of four output signals zip2n2v2p, unzip2n4v1p, zip2n4v1p and zip4n2v1p. The zip2n4v1p and zip4n2v1p outputs are supplied to a first OR gate 164 the output of which controls the eighth multiplexor 150. The output signal zip4n2v1p is also supplied to a second OR gate 166 which receives the output unzip2n4v1p. The output of the second OR gate controls the fourth, fifth, seventh and tenth multiplexors. The signal unzip2n4v1p controls the third and sixth multiplexors. The output zip2n2v2p controls the first and ninth multiplexors. All four outputs of the type unit 162 are supplied to a third OR gate 168 which determines whether or not the output buffer 132 is enabled. Some of the logic paths are shared in FIG. 9, thus requiring only ten 8 bit multiplexors. The source and result are shown as packed 8 bit objects. However, one of the instructions this implements is defined in terms of packed 16 bit objects and this is achieved by taking pairs of source and result 8 bit objects.

The 64 bit zips and unzips are:

zip4n2v1p Zips (interleaves) vectors of two 8 bit objects. This is the same as unzipping (deinterleaving) the same vectors.

zip2n4v1p Zips (interleaves) vectors of four 8 bit objects.

unzip1n4v1p Unzips (deinterleaves) vectors of four 8 bit objects.

zip2n2v2p Zips (interleaves) vectors of two 16 bit objects. This is the same as unzipping (deinterleaving) the same objects.

Figure 10:
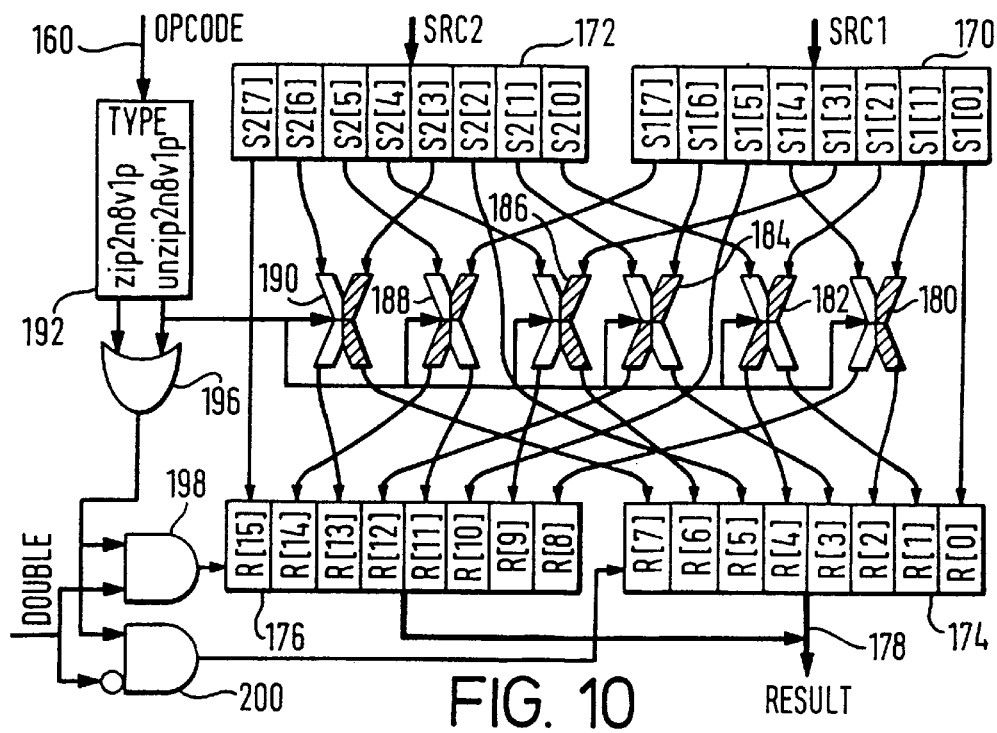
FIG. 10 shows part of the twist and zip unit for performing Double length 8 bit zips and unzips.

FIG. 10 shows the part of the twist and zip unit which performs the double length 8 bit zip and unzip instructions. This part of the twist and zip unit comprises first and second input buffers 170,172 each of which hold a 64 bit word. The 64 bit words held in the input buffers 170,172 can be viewed as a continuous data string which has sixteen objects labelled from S1[0] to S2[7]. There are first and second output buffers 174,176 which each hold a 64 bit word. The result is output on line 178. There are six changeover switches 180 to 190 each of which have two inputs and two outputs. The inputs of the changeover switches 180 to 190 are connected to locations in the first and second input buffers 170,172 as illustrated in FIG. 10. The outputs of the changeover switches 180 to 190 are connected to locations in the first and second output buffers 174,176 as illustrated in FIG. 10. The connections are such that either the zip2n8v1p operation or the unzip2n8v1p operation as illustrated in FIG. 7 can be implemented. It can be seen from FIG. 10 that the first location in the first input buffer S1[0] and the last location in the second input buffer S2[7] are connected respectively to the first location R1[0] in the output buffer and the last location R2[7] in the second output buffer. In this way, the locations in the data string of the first and last objects remains unchanged after restructuring of the data string according to the zip and unzip instruction. A type unit 192 receives opcode on line 160 derived from the route opcode unit 82 in FIG. 3. The type unit 192 outputs two signals dependent on whether the restructuring instruction is a zip or unzip instruction, zip2n8v1p or unzip2n8v1p. These output signals are supplied to an OR gate 196. The unzip2n8v1p signal controls the changeover switches 180 to 190. The output of the OR gate 196 is supplied to two AND gates 198,200. The AND gate 198 also receives the Double signal 58. The AND gate 200 receives the Double signal 58, inverted. The AND gate 200 controls the first output buffer 174 and the AND gate 198 controls the second output buffer 176. The two output buffers are controlled by the Double signal which causes the first output buffer 174 to supply its contents along line 178 to a first destination register and then changes state so that the second output buffer 176 supplies its contents along line 178 to a subsequent register in the register file 12.

The two instructions processed are:

zip2n8v1p Zip (interleave) vectors of eight 8 bit objects.

unzip2n8v1p Unzip (deinterleave) vectors of eight 8 bit objects.

Figure 11:
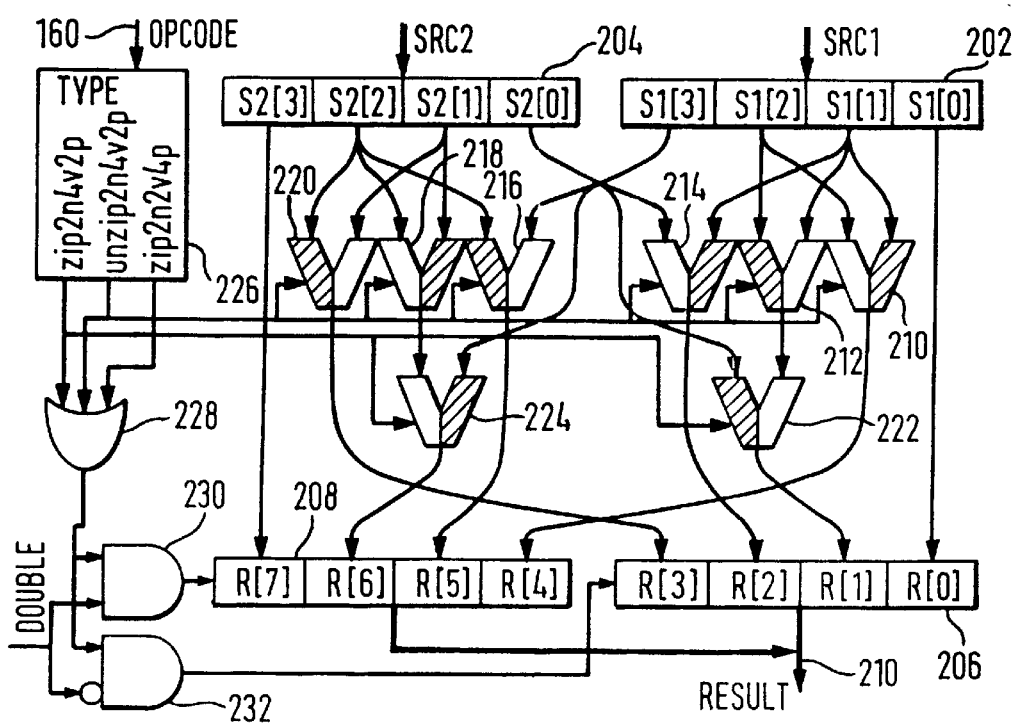
FIG. 11 shows part of the twist and zip unit for performing Double length 16 bit and 32 bit zips and unzips.

FIG. 11 shows the part of the twist and zip unit which performs the double length 16 bit and 32 bit zip and unzip instructions. This part has first and second input buffers 202,204 each of which holds a 64 bit word defining four 16 bit objects in packed form. Two objects can be dealt with together by use of the 32 bit zip instruction. First and second output buffers 206 and 208 each hold a 64 bit word defining four packed 16 bit objects R[0] to R[3], R[4] to R[7]. The result is supplied on line 210. The Double signal 58 controls the sequence in which the output buffers assert their its output. As with the other parts of the twist and zip unit, locations in the first input buffer for the first object are connected directly to the first object location in the first output buffer. Likewise, the last source object location in the second input buffer 204 is connected directly to the last result object location R[7] in the second output buffer 208.

A first multiplexor 212 receives as one input the source object S1[1] and as a second input the source object S1[2]. A second multiplexor 212 receives as one input the second source object S1[1] and as a second input the third source object S1[2]. A third multiplexor 214 receives as one input the second source object S11 and as a second input the first source object S2[0] of the second input buffer. A fourth multiplexor 216 receives as one input the source object S1[3] and as a second input the source object S2[2]. A fifth multiplexor 218 receives as one input the source object S2[1] and as a second input the source object S2[2]. A sixth multiplexor 220 receives as one input the source object S2[1] and as a second input the source object S2[2]. The output of the first multiplexor 210 supplies the first result object R[4] of the second output buffer 208. The output of the second multiplexor 212 is supplied to a seventh multiplexor 222 which receives as its second input the source object S2[0]. The output of the second multiplexor 222 supplies the second result object R[1] in the first output buffer 206. The output of the third multiplexor 214 supplies the third result object R[2] in the first output buffer 206. The output of the fourth multiplexor 216 supplies the second result object R[5] in the second output buffer 208. The output of the fifth multiplexor 218 is supplied as one input to an eighth multiplexor 224 which receives as its second input the source object S1[3]. The output of the eighth multiplexor 224 supplies the third result object R[6] in the second output buffer 208. The output of the sixth multiplexor 220 supplies the fourth result object R[3] in the first output buffer 206. A type unit 226 receives opcode on line 160 from the route opcode unit 82 of FIG. 3. The type unit generates three output signals depending on the type of restructuring operation to be carried out by this part of the twist and zip unit. These signals are zip2n4v2p, unzip2n4v2p and zip2n2v4p. These signals are supplied to an OR gate 228 the output of which is supplied to two AND gates 230 and 232. The AND gate 230 also receives the double signal. The AND gate 232 receives an inverted version of the double signal. The outputs of the AND gates 230,232 control activation of the output buffers 206,208.

The zip2n4v2p signal controls the third and seventh multiplexors 214,222. The unzip2n4v2p signal controls the first, second, fourth and fifth multiplexors.

The three instructions processed by this part of the twist and zip unit are:

zip2n4v2p Zip (interleave) vectors of four 16 bit objects.

unzip2n4v2p Unzip (deinterleave) vectors of four 16 bit objects.

zip2n2v4p Zip (interleave) vectors of two 32 bit objects. This is the same as unzipping (deinterleaving) the same vectors.

Figure 12:
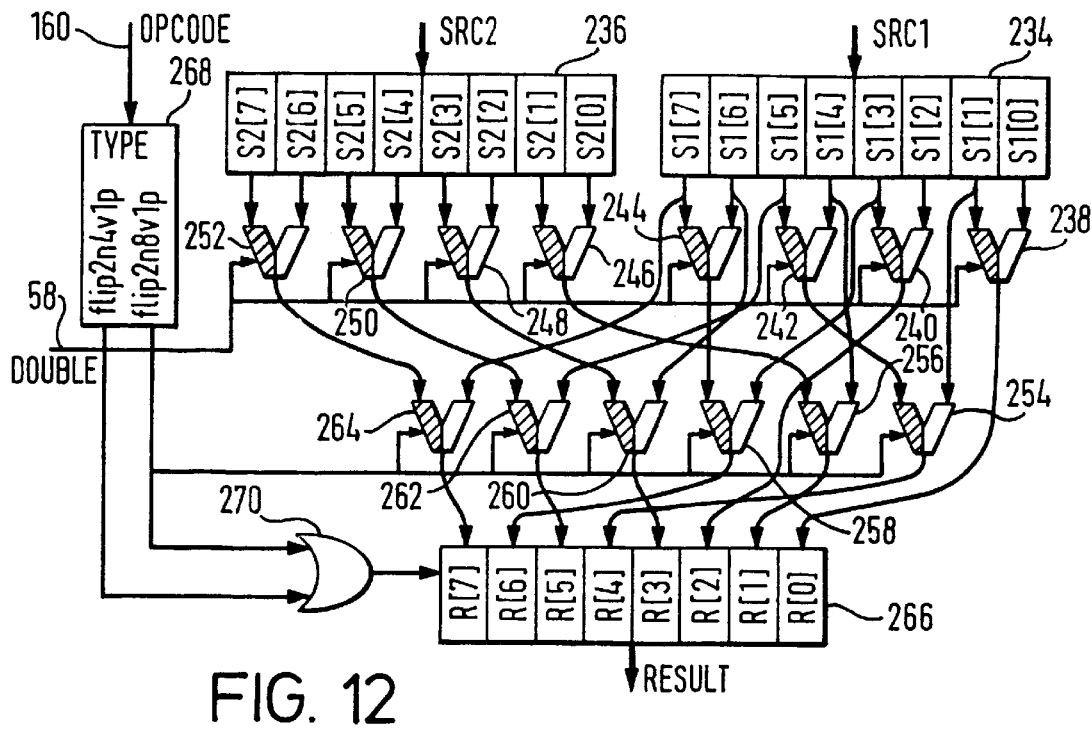
FIG. 12 shows the part of the twist and zip unit for performing 8 bit flips.

FIG. 12 shows the part of the twist and zip unit which can perform the 8 bit flips. This does both the single length and double length operations. In FIG. 12 there are two input buffers 234,236 each containing a 64 bit word packed as 8 bit objects. Adjacent pairs of objects in the first and second input buffers 234,236 are supplied to respective multiplexors 238–252. A second set of multiplexors 254–264 is arranged as follows. The first multiplexor 254 of the second set receives as one input the second source object in the first output buffer 234 and as a second input the output of the third multiplexor 242 of the first set. The second multiplexor 256 of the second set receives as one input the fifth source object of the first output buffer 234 and as a second input the output of the fifth multiplexor 246 of the first set. The third multiplexor 258 of the second set receives as one input the fourth source object of the first output buffer 234 and as a second input the output of the fourth multiplexor 244 of the first set. The fourth multiplexor 260 of the second set receives as one input the seventh source object of the first output buffer 234 and as a second input the output of the sixth multiplexor of the first set. The fifth multiplexor 262 of the first set receives as one input the sixth source object of the first output buffer and as a second input the output of the seventh multiplexor 250 of the first set. The sixth multiplexor 264 of the second set receives as one input the eighth source object of the first output buffer 234 and as a second input the output of the eighth multiplexor 252 of the first set. The 8 bit flip part of the twist and zip unit also includes an output buffer 266 for accommodating a 64 bit word as 8 bit packed objects. The first result object is supplied as the output of the first multiplexor 238 of the first set. The second source object is supplied as the output of the second multiplexor 256 of the second set. The third object of the result is supplied as the output of the second multiplexor 240 of the first set. The fourth object of the result is supplied as the output of the fourth multiplexor 260 of the second set. The fifth object of the result is supplied as the output of the first multiplexor 254 of the first set. The sixth object of the result is supplied as the output of the fifth multiplexor 262 of the second set. The seventh object of the result is supplied as the output of the third multiplexor 258 of the second set. The eighth object of the result is supplied as the output of the sixth multiplexor of the second set 164. A type unit 268 receives opcode on line 160 and produces two signals depending on the type of restructuring operation to be carried out. These signals are flip2n4v1p and flip2n8v1p. These signals are supplied to an OR gate 270 the output of which controls the output buffer 266. The Double signal 58 controls the multiplexors 238 to 252 of the first set. The Double signal will only be active for the upper part of double length instructions. The multiplexors in the second set 254 to 264 are controlled by the flip2n8v1p signal.

In FIG. 12, only a single 64 bit output buffer is illustrated. When the flip2n4v1p instruction is being executed, the buffer corresponds to the single output buffer shown in FIG. 9. When the 2n8v1p flip instruction is being executed, the output buffer first holds and supplies the RESULT LOW part of the result and then, when the Double signal 58 is asserted, holds and supplies the RESULT HIGH part of the result.

The two instructions processed by the unit are:
flip2n4v1p Flip vectors of four 8 bit objects.
flip2n8v1p Flip vectors of eight 8 bit objects.

Figure 13:
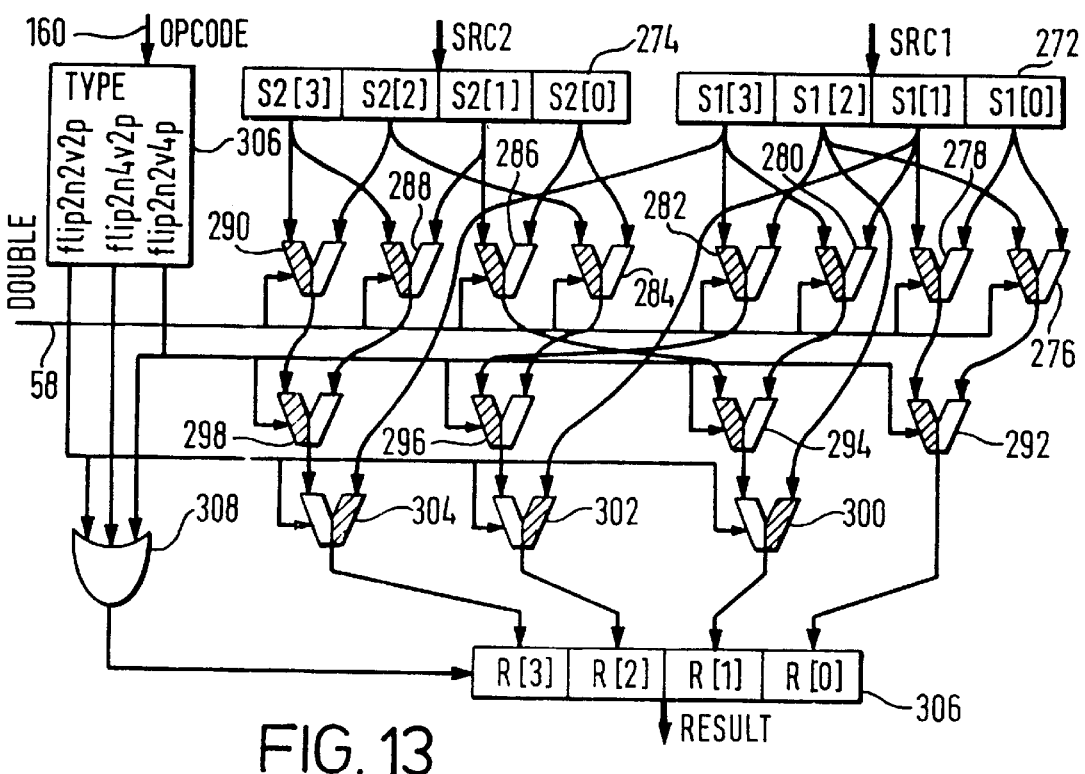
FIG. 13 shows the part of the twist and zip unit for performing 16 bit and 32 bit flips.

FIG. 13 shows the part of the twist and zip unit which performs the 16 bit and 32 bit flips. As with the 8 bit flip unit, it performs both single and double length flips. The 32 bit objects are dealt with as pairs of 16 bit objects.

The three instructions processed by the unit are:
flip2n2v2p Flip vectors of two 16 bit objects.
flip2n4v2p Flip vectors of four 16 bit objects.
flip2n2v4p Flip vectors of two 32 bit objects.

Two of these three flips are the same as two of the zips. Therefore, if both sets of instructions are present, only one set of hardware needs implementing.

This part of the twist and zip unit comprises first and second input buffers 272,274 each of which accommodates a 64 bit word packed as four 16 bit objects S1[0] to S1[3] in the first input buffer and S2[0] to S2[3] in the second input buffer 274. A first set of multiplexors 276 to 290 receive inputs from the first and second input buffers 272,274 as follows. The first multiplexor 276 of the first set receives as one input the first source object S1[0] and as a second input the third source object S1[2]. The second multiplexor 278 of the first set receives as one input the first source object S1[0] and as a second input the second source object S1[1]. The third multiplexor 280 of the first set receives as one input the second source object S1[1] and as a second input the fourth source object S1[3]. The fourth multiplexor of the first set 282 receives as one input the third source object S1[2] and as a second input the fourth source object S1[3]. The fourth multiplexor 284 of the first set receives as one input the first source object S2[0] of the second buffer 274 and as a second input the third source object S2[2]. The sixth multiplexor 286 of the first set receives as one input the first source object S2[0] of the second buffer 274 and as a second input the second source object S2[1]. The seventh multiplexor 288 receives as one input the second source object S2[1] and as a second input the fourth source object S2[3]. The eighth multiplexor 290 receives as one input the third source object S2[2] of the second input buffer 274 and as a second input the fourth source object S2[3]. A second set of multiplexors 292 to 298 receive inputs as follows. The first multiplexor 292 of the second set receives as inputs the outputs of the first and second multiplexors 276,278 of the first set. The second multiplexor 294 of the second set receives as inputs the outputs from the third and sixth multiplexors 280,286 of the first set. The third, multiplexor 296 of the second set receives as inputs the output of the fifth multiplexor 284 of the first set and the fourth multiplexor 282 of the first set. The fourth multiplexor of the third set receives as inputs the outputs of the seventh and eighth multiplexors 288,290 of the first set. A third set of multiplexors 300–304 receive inputs as follows. The first multiplexor 300 of the third set receives as inputs the third source object S1[2] of the first input buffer 272 and the output of the second multiplexor 294 of the third set. The second multiplexor 302 of the third set receives as inputs the second source object S1[1] of the first input buffer 272 and the output of the third multiplexor 296 of the second set. The third multiplexor 304 of the third set receives as inputs the fourth object S1[3] of the first input buffer 272 and the output of the fourth multiplexor 298 of the second set.

This part of the twist and zip unit also contains an output buffer 306 capable of accommodating a 64 bit word packed as four 16 bit objects. The first result object R[0] is derived from the first multiplexor 292 of the second set. The second to fourth result objects R[1] to R[3] are derived from the outputs of the multiplexors of the third set 300–304.

A type unit 306 receives opcode on line 160 from the route opcode unit 82 in FIG. 3. The type unit generates three signals depending on the type of restructuring instruction to be executed by this part of the unit. The signals are flip2n2v2p, flip2n4v2p and flip2n2v4p. These signals are supplied to an OR gate 308 the output of which controls the output buffer 306. The Double signal 58 controls the multiplexors of the first set 276 to 290. The flip2n2v4p signal controls the multiplexors of the second set. The flip2n2v2p signal controls the multiplexors of the third set.

When this part of the unit is used to execute the flip2n2v2p unit, the output buffer is the single output buffer shown in FIG. 9 for that instruction. When this part of the unit is used to execute the flip2n4v2p or flip2n2v4p instructions, the output buffer behaves as described above with reference to FIG. 12.

Examples of the use of the byte replicate and byte twist and zip instructions will now be given. In the following examples, the assembly notation denotes register operands as Rn, where n is any number. Constant operands are simply n. Instructions which produce a double length result specify only the first of a pair of registers. The upper part of the result is then written to the next register. Labels are denoted by an alphanumeric string followed by a ":".

One particularly useful operation is matrix transposition.

Matrix Transpose

The zips, unzips or flips can be used to transpose matrices. Matrices which cannot be transposed in a single instruction can be dealt with in a series of steps which operate on larger sub-units.

Matrices are drawn starting at the top left and proceeding along each row in turn down to the bottom right. This row ordering representation is the opposite way around to that used in the diagrams of the functional units.

Using Flips

Figure 14:
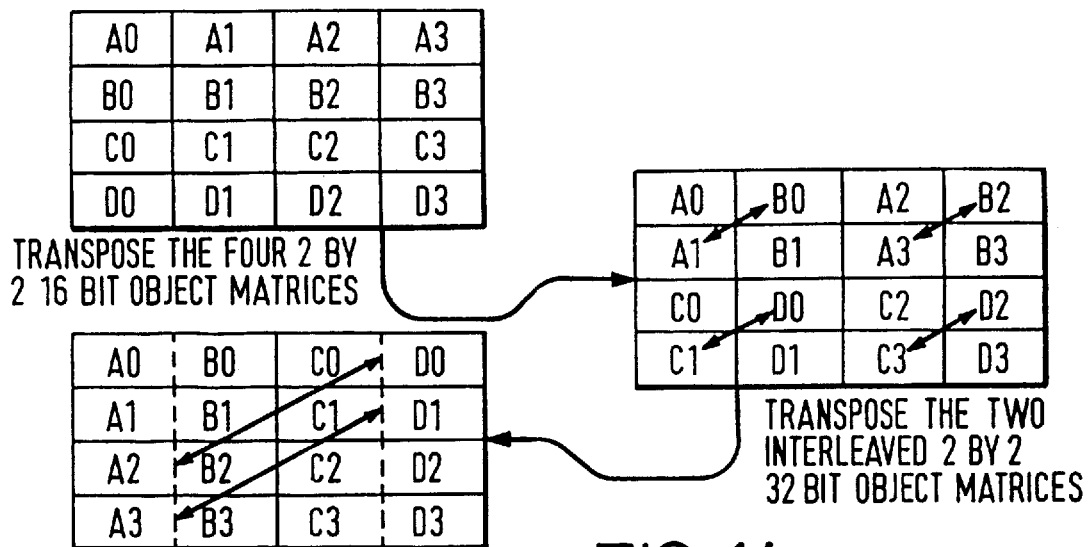
FIG. 14 shows a matrix transposition operation using flip instructions.

For instance in the transpose of a 4 by 4 matrix of 16 bit objects, using flips, the four quadrants need individually transposing (each being a 2 by 2 of 16 bit objects), and the upper right and lower left quadrants of the 4 by 4 need swapping. This can be done by treating the matrix as two interleaved 2 by 2 matrices of 32 bit objects, and transposing them. FIG. 14 shows the operations to do this.

The assembly code to perform the transpose is shown in Annexe A, Sequence (i).

Using Zips

Figure 15:
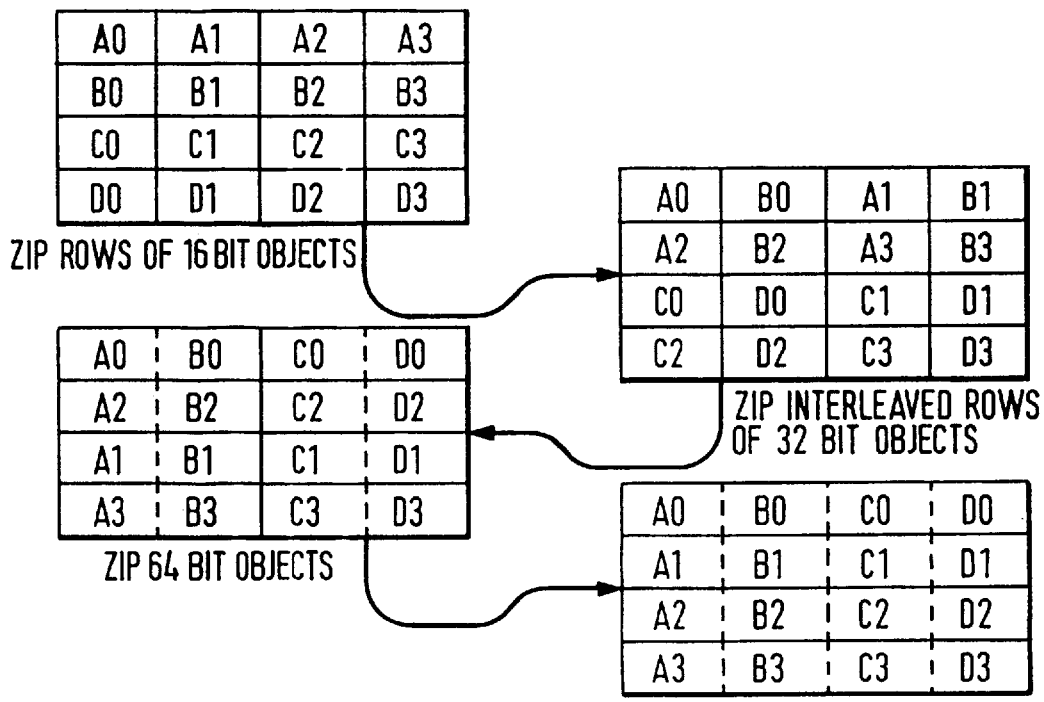
FIG. 15 shows a matrix transposition operation using zip instructions.

To transpose the same matrix using zips (perfect shuffles) requires a series of shuffles of the 16 bit objects, then on pairs of 16 bit objects and then on quadruples of 16 bit objects. FIG. 15 shows the operations to do this.

The assembly code to perform this is shown in Annexe A, Sequence (ii).

Using Unzips

Figure 16:
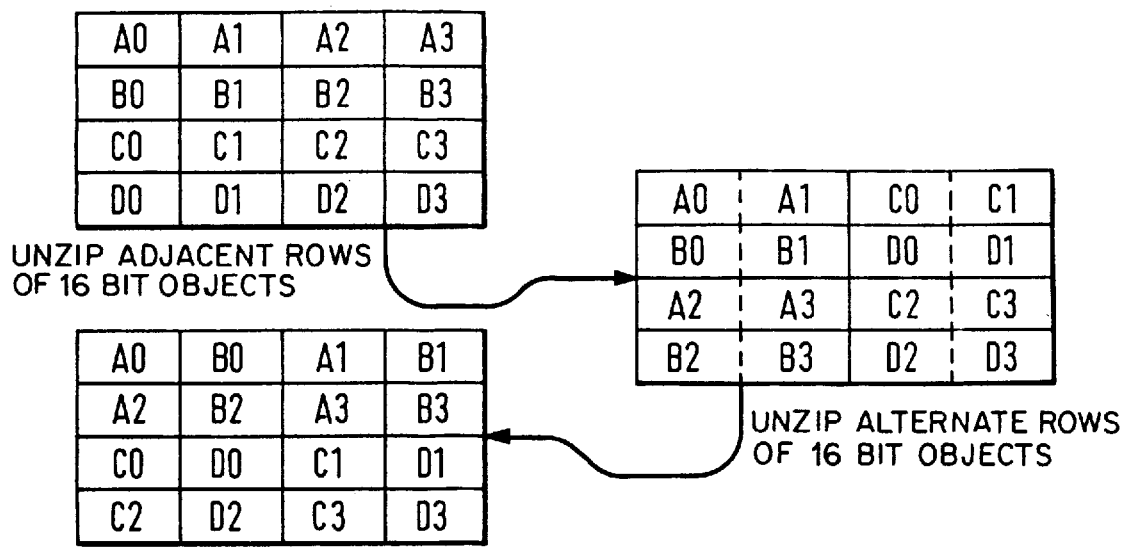
FIG. 16 shows a matrix transposition operation using unzip instructions.

To transpose the same matrix using unzips (perfect sorts) requires sorts of 16 bit objects. FIG. 16 shows the operations to do this.

The assembly code to perform this is shown in Annexe A, Sequence (iii).

Annexe A Sequence (iii) shows transposition of a 4×4 matrix of bytes using unzips.

Matrix Multiplication

Matrix multiplication consists of a set of multiply accumulates. The most common case is multiplication of a vector (1 dimensional) by a matrix (2 dimensional) to produce another vector.

$$v_0 \ldots v_{N-1} \quad \begin{matrix} M_{0,0} & \ldots & M_{0,M-1} \\ M_{N-1,0} & \ldots & M_{N-1,M-1} \end{matrix}$$

If [V] and [M] contain 16 bit data, the packed 16 bit multiplication can be used to perform the calculation.

One way of performing the multiplication is to replicate each element of the vector using the byte replicate instruction, perform packed multiples of each replicated element by the correct row of the matrix, and then perform a packed addition of the partial products. Note that there is no requirement to transpose the matrix. The code sequence for doing this is shown in Annexe A, Sequence (iv).

Figure 17:
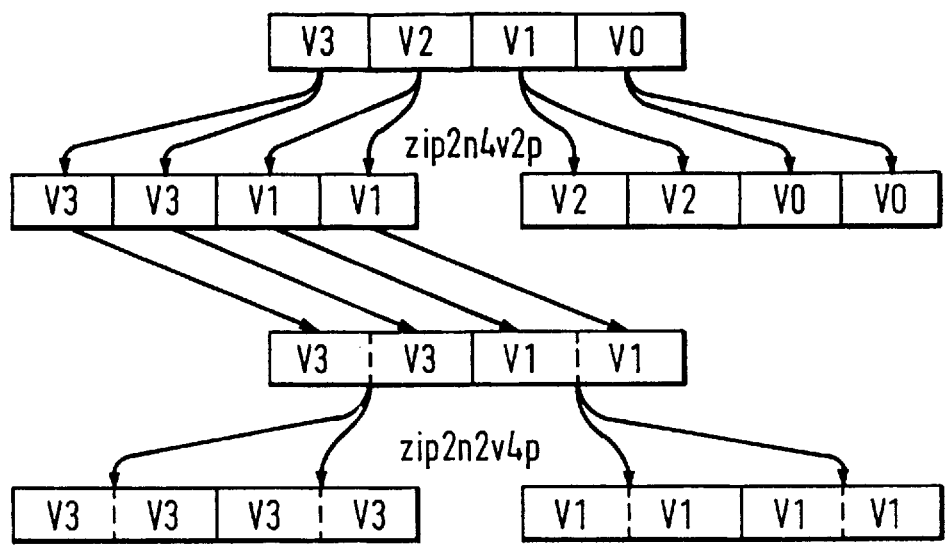
FIG. 17 shows how replication can be achieved using zip instructions.

Another way of replicating the vector elements is by using zips. FIG. 17 shows how this is achieved.

The code sequence which does that for matrix multiplication is shown in Annexe A, Sequence (v).

Data Format Conversion

Conversion between different formats can be performed with zips and unzips. Signed conversions to a larger format require duplication of the sign bit, and this can be done with a signed right shift. Table 1 shows the instructions required for converting between various unsigned formats and Table 2 shows the signed conversions.

String Search

String searching is used when it is required to know if a string contains a certain character. By replicating the search character and performing a packed comparison several characters can be tested simultaneously. A code sequence for this search is shown in Annexe A, Sequence (vi).

Replicate

It is possible to use zips, unzips or flips to perform a replicate of 1, 2 or 4 byte objects. The respective sequences in Annexe B(i), (ii) and (iii) show how to replicate the rightmost byte.

Converting Between RGBα and Planar Video Formats

For use in a graphics environment, RGBα (or packed) format is where four consecutive bytes contain red, green, blue and alpha colour information for a single pixel. Thus each pixel occupies four consecutive bytes. Planar format is where all the red, green, blue and alpha colour information is stored in separate areas of memory. Thus all the same colour information is contiguous and each pixel corresponds to four non-contiguous bytes of memory.

Conversion between the RGBα format and planar format in either direction can be done by zips or unzips. A conversion sequence from RGBα to planar using zips is shown in Annexe B(iv), and using unzips is shown in Annexe B(v).

A conversion sequence from planar to RGBα using zips is shown in Annexe B(vi) and using unzips in Annexe B(vii).

It is possible to do the conversion using flips, but the pixels then become interleaves, which is undesirable.

Rotation

Rotation of matrices can be performed by zips or unzips. Sequences for this are shown in Annexe B(viii) and (ix). Similar sequences can also be used to support the rotation of graphical objects.

- 29 -

Annexe A, Sequence (i)

```
;transpose of 4 by 4 16-bit object matrix using flips
;matrix is initially in registers R1 to R4
flip2n4v2p R6,R1,R2          ;transpose the top two
flip2n4v2p R8,R3,R4          ;transpose the bottom two
flip2n2v4p R1,R6,R8          ;transpose the first interleaved
flip2n2v4p R3,R7,R9          ;transpose the second interleaved
;the transposed matrix is now in registers R1,R3,R2,R4
```

Annexe A, Sequence (ii)

```
;transpose of 4 by 4 matrix of 16-bit objects using zips
;matrix is in register R1 to R4
zip2n4v2p R6,R1,R2           ;zip the first two rows
zip2n4v2p R8,R3,R4           ;zip the last two rows
zip2n2v4p R1,R6,R8           ;zip first interleaved rows
zip2n2v4p R3,R7,R9           ;zip second interleaved rows
;note because the zip result is in adjacent registers, these
;last two instructions have done the zip of the 64 bit objects too.
;transposed matrix is in register R1 to R4
```

Annexe A, Sequence (iii)

```
;transpose of a 4by4 matrix of 2-bytes using unzips
;source matrix is in R0, R1, R2, R3, one row per register
unzip2n4v2pR4,R0,R1
unzip2n4v2pR6,R2,R3
unzip2n4v2pR8,R4,R6
unzip2n4v2pR10,R5,R7
;result is in R8,R10,R9 and R11
```

Annexe A, Sequence (iiia)

```
;transpose of a 4by4 matrix of bytes using unzips
;source matrix is in R0 and R1, two rows per register
unzip2n8v1pR2,R0,R1
unzip2n8v1pR4,R2,R3
;result is in R4 and R5
```

- 30 -

Annexe A, Sequence (iv)

```
;multiply a vector by a matrix using multiply add
;given [V] and [M] this calculates [V][M]
;V contains four 16 bit elements, and M is 4 by 4 of 16 bit elements
;V is contained in R1
;M is contained in R2 to R5
rep2p     R6,R1           ;duplicate first element
mul2ps    R7,R6,R2        ;first set of partial products
shr       R6,R1,16        ;shift down second element of vector
rep2p     R6,R6           ;duplicate the second element
mul2ps    R8,R6,R3        ;second set of partial products
add2p     R7,R7,R8        ;sum into R7
shr       R6,R1,32        ;shift down third element of vector
rep2p     R6,R6           ;duplicate the third element
mul2ps    R8,R6,R4        ;third set of partial products
add2p     R7,R7,R8        ;sum into R7
shr       R6,R1,48        ;shift down fourth element of vector
rep2p     R6,R6           ;duplicate the fourth element
mul2ps    R8,R6,R4        ;fourth set of partial products
add2p     R7,R7,R8        ;sum into R7
;the product is in R7
```

Annexe A, Sequence (v)

```
;multiply a vector by a matrix using multiply add
;given [V] and [M] this calculates [V][M]
;V contains four 16 bit elements, and M is 4 by 4 of 16 bit elements
;V is contained in R1
;M is contained in R2 to R5
zip2n4v2p  R6,R1,R2       ;make pairs of vector element duplicates
zip2n2v4p  R8,R6,R6       ;make quads of first two elements
zip2n2v4p  R10,R7,R7      ;make quads of second two elements
mul2ps     R8,R8,R2       ;first set of partial products
mul2ps     R9,R9,R3       ;second set of partial products
mul2ps     R10,R10,R4     ;third set of partial products
mul2ps     R11,R11,R4     ;fourth set of partial products
add2p      R6,R8,R9       ;add first and second set together
add2p      R7,R10,R11     ;add third and fourth set together
add2p      R6,R6,R7       ;add these
;the product is in R6
```

- 31 -

Annexe A, Sequence (vi)

```
;strchr
;R1 points to the string
;R2 is the character to search for
;the string is terminated by a character of zero
replp       R2,R2               ;replicate the search character
loop:
load        R3,R1               ;get 8 bytes of the string
add         R1,R1,8             ;point to the next 8
cmpelp      R4,R3,0             ;test for end of string
cmpelp      R5,R3,R2            ;test for desired character
or          R6,R4,R5
jumpz       R6,loop             ;repeat if not found
;now need to determine if it was the end of the string, or the char
sub         R6,R4,1
xor         R6,R4,R6            ;mask before end of string
and         R6,R5,R6            ;mask of permissable target characters
jumpz       R6,not_found
;now determine which particular char was found
;this bit is a loop as I haven't defined a count zero bits instruction
repeat:
sub         R1,R1,1             ;rewind pointer
shl         R6,R6,8             ;shift up 8 bits
jumpnz      R6,repeat           ;repeat if not cleared
;now R1 points to the located character
```

Annexe B, Sequence (i)
```
;replicate using zips
;the source is in R0
zip2n8v1p R1,R0,R0
zip2n8v1p R1,R1,R1
zip2n8v1p R2,R1,R1
;the replicated value is in R2
```

Annexe B, Sequence (ii)
```
;replicate using unzips
;the source is in R0
unzip2n8v1pR1,R0,R0
unzip2n8v1pR1,R1,R1
unzip2n8v1pR2,R1,R1
;the replicated value is in R2
```

Annexe B, Sequence (iii)
```
;replicate using flips
;the source is in R0
flip2n8v1p R1,R0,R0
flip2n4v2p R1,R1,R1
flip2n2v4p R2,R1,R1
;the replicated value is in R2
```

- 32 -

Annexe B, Sequence (iv)
```
;RGBα to Planar using zips
;source is 8 RGBα pixels in R0, R1, R2 and R3 (two per register)
zip2n8v1p  R4,R0,R1
zip2n8v1p  R6,R2,R3
zip2n4v2p  R8,R4,R6
zip2n4v2p  R10,R5,R7
zip2n2v4p  R12,R8,R10
zip2n2v4p  R14,R9,R11
;result is in registers R12,R13,R14,R15 as 8α, 8blue, 8green and 8red
```

Annexe B, Sequence (v)
```
;RGBα to Planar using unzips
;source is 8 RGBα pixels in R0, R1, R2 and R3 (two per register)
unzip2n8v1p R4,R0,R1
unzip2n8v1p R6,R2,R3
unzip2n8v1p R8,R4,R6
unzip2n8v1p R10,R5,R7
;result is in registers R8,R9,R10,R11 as 8α, 8green, 8blue and 8red
```

Annexe B, Sequence (vi)
```
;Planar to RGBα using zips
;source is 8α, 8blue, 8green and 8red in R0, R1, R2 and R3
zip2n8v1p  R4,R0,R1
zip2n8v1p  R6,R2,R3
zip2n4v2p  R8,R4,R6
zip2n4v2p  R10,R5,R7
;result is in registers R8,R9,R10,R11 as 2 pixels per register
```

Annexe B, Sequence (vii)
```
;Planar to RGBα using unzips
;source is 8α, 8blue, 8green and 8red in R0, R1, R2 and R3
unzip2n8v1p R4,R0,R1
unzip2n8v1p R6,R2,R3
unzip2n4v2p R8,R4,R6
unzip2n4v2p R10,R5,R7
unzip2n8v1p R12,R8,R10
unzip2n8v1p R14,R9,R11
;result is in registers R12,R13,R14,R15 as 2 pixels per register
```

Annexe B, Sequence (viii)
```
;rotation anticlockwise of a 4by4 matrix of bytes using zips
;source matrix is in R0 and R1, two rows per register
zip2n8v1p  R2,R1,R0
zip2n8v1p  R4,R3,R2
;result is in R4 and R5
```

- 33 -

Annexe B, Sequence (ix)

```
;rotation clockwise of a 4by4 matrix of bytes using unzips
;source matrix is in R0 and R1, two rows per register
unzip2n8v1pR2,R0,R1
unzip2n8v1pR4,R3,R2
;result is in R5 and R4
```

TABLE 1

Unsigned Conversions

| From→<br>To↓ | 8-bit | 16-bit | 32-bit | 64-bit |
|---|---|---|---|---|
| 8-bit |  | unzip2n8v1p<br>R, S1, S2 |  |  |
| 16-bit | zip2n8v1p<br>R, S, 0 |  | unzip2n4v2p<br>R, S1, S2 |  |
| 32-bit |  | zip2n4v2p<br>R, S, 0 |  | unzip2n2v4p<br>R, S1, S2 |
| 64-bit |  |  | zip2n2v4p<br>R, S, 0 |  |

TABLE 2

Signed Conversions

| From→<br>To↓ | 8-bit | 16-bit | 32-bit | 64-bit |
|---|---|---|---|---|
| 8-bit |  | unzip2n8v1p<br>R, S1, S2 |  |  |
| 16-bit | shr1ps<br>tmp, S, 7<br>zip2n8v1p<br>R, S, tmp |  | unzip2n4v2p<br>R, S1, S2 |  |
| 32-bit |  | shr2ps<br>tmp, S, 15<br>zip2n4v2p<br>R, S, tmp |  | unzip2n2v4p<br>R, S1, S2 |
| 64-bit |  |  | shr4ps<br>tmp, S, 31<br>zip2n2v4p<br>R, S, tmp |  |

What is claimed is:

1. A method of operating a computer system to process a digital signal by effecting a matrix transpose operation of a matrix representing the digital signal, the matrix comprising a plurality of multi-bit data values at respective row and column locations, steps of the method repeated a plurality of times, until the matrix is transposed, which method comprises steps of:

forming a data string representing two rows of the matrix from a plurality of sub-strings each representing at least one said data value of said two rows;

holding said data string in a computer store having a predetermined bit capacity wherein said sub-strings are not individually addressable; and restructuring said data string by retaining first and last sub-strings of the data string in unchanged positions and interchanging the position of at least two intermediate sub-strings, in a restructured data string, to effect an interchange of selected data values, wherein during different repetitions of the steps the two intermediate sub-strings have a different length.

2. A method according to claim 1 wherein the positions of said at least two intermediate sub-strings are exchanged with each other in the restructured data string.

3. A method according to claim 1 wherein alternate ones of said intermediate sub-strings are located adjacent one another in the restructured data string.

4. A method according to claim 1 wherein adjacent ones of said intermediate sub-strings are located at alternate locations in the restructured data string.

5. A method according to claim 1 wherein the computer store comprises a register store having a predetermined bit capacity and addressable by a single address, data values of each of two rows of the matrix being held in said register store to constitute said data string.

6. A method according to claim 2 wherein the computer store comprises a pair of register stores each having a predetermined bit capacity and addressable by a single address, data values in each of two rows of the matrix being held in a respective one of said register stores, wherein the data string represents data values of a pair of rows of the matrix.

* * * * *